(12) United States Patent
Yazawa et al.

(10) Patent No.: US 7,889,457 B2
(45) Date of Patent: Feb. 15, 2011

(54) PERPENDICULAR MAGNETIC RECORDING HEAD DEVICE CAPABLE OF INCREASING MAGNETIC FIELD GRADIENT TO EXHIBIT EXCELLENT RECORDING PERFORMANCE WHILE MAINTAINING MAGNETIC FIELD INTENSITY

(75) Inventors: Hisayuki Yazawa, Niigata-ken (JP); Toshinori Watanabe, Niigata-ken (JP)

(73) Assignee: TDK Corporation, Tokyo (JP)

( * ) Notice: Subject to any disclaimer, the term of this patent is extended or adjusted under 35 U.S.C. 154(b) by 469 days.

(21) Appl. No.: 11/611,473

(22) Filed: Dec. 15, 2006

(65) Prior Publication Data

US 2007/0139819 A1 Jun. 21, 2007

(30) Foreign Application Priority Data

Dec. 20, 2005 (JP) .............................. 2005-366836

(51) Int. Cl.
*G11B 5/147* (2006.01)
*G11B 5/187* (2006.01)

(52) U.S. Cl. ................................................. 360/125.26

(58) Field of Classification Search ............ 360/125.16, 360/125.26, 125.24
See application file for complete search history.

(56) References Cited

U.S. PATENT DOCUMENTS 4,742,413 A 5/1988 Schewe

| | | | |
|---|---|---|---|
| 6,791,796 B2 * | 9/2004 | Shukh et al. | 360/125.12 |
| 6,965,494 B2 * | 11/2005 | Campbell et al. | 360/125.04 |
| 2005/0068670 A1 * | 3/2005 | Amin et al. | 360/125 |
| 2005/0068671 A1 | 3/2005 | Hsu et al. | |
| 2005/0083608 A1 | 4/2005 | Watanabe | |
| 2007/0041127 A1 * | 2/2007 | Kameda et al. | 360/126 |

FOREIGN PATENT DOCUMENTS

| JP | 62-159313 | 7/1987 |
|---|---|---|
| JP | 2005-108412 | 4/2005 |
| JP | 2005-122831 | 5/2005 |

\* cited by examiner

*Primary Examiner*—Jefferson Evans
(74) *Attorney, Agent, or Firm*—Hunton & Williams, LLP

(57) ABSTRACT

There is provided a perpendicular magnetic recording head device which can increase magnetic field gradient to exhibit excellent recording performance while maintaining magnetic field intensity capable of performing information recording well. In a perpendicular magnetic recording head device composed of a main magnetic pole layer and a return path layer which are laminated with a nonmagnetic insulating layer therebetween, the return path layer has a two-layer structure composed of a low saturation magnetic flux density layer (low Bs layer), and a high saturation magnetic flux density layer (high Bs layer) formed an the low Bs layer and made of a material that has a relatively high saturation magnetic flux density. In a front end surface of the return path layer, the low Bs layer and the high Bs layer are exposed.

4 Claims, 6 Drawing Sheets

PERPENDICULAR MAGNETIC RECORDING HEAD DEVICE CAPABLE OF INCREASING MAGNETIC FIELD GRADIENT TO EXHIBIT EXCELLENT RECORDING PERFORMANCE WHILE MAINTAINING MAGNETIC FIELD INTENSITY

CROSS REFERENCE TO RELATED APPLICATIONS

This application claims the benefit of Japanese Patent Application 2005-366836 filed Dec. 20, 2005, which is hereby incorporated by reference.

TECHNICAL FIELD

The present invention relates to a perpendicular magnetic recording head device which applies a magnetic field perpendicular to a recording medium surface to perform information recording.

BACKGROUND

As magnetic head devices, there are a longitudinal recording (in-plane recording) type head device which performs a magnetic field parallel to a recording head surface to perform information recording, and a perpendicular magnetic recording type head device which applies to a magnetic field perpendicular to a recording medium surface to perform information recording, the perpendicular magnetic recording head device of which is considered prevailing in consideration of future higher-density recording.

The perpendicular magnetic recording head device has a laminated structure formed by providing a return path layer on a main magnetic pole layer with a nonmagnetic insulating layer interposed between the main magnetic pole layer and the return path layer, on the surface (medium-facing surface) thereof facing a recording medium. The main magnetic pole layer and the return path layer are electrically connected to each other on the deeper side in the height direction than the medium-facing surface. Moreover, coil layers for applying a recording magnetic field to the main magnetic pole layer and the return path layer are buried in the nonmagnetic insulating layer. In a magnetic head device that has such a configuration, a recording magnetic field is induced between the main magnetic pole layer and the return path layer by energizing the coil layers. This recording magnetic field perpendicularly enter a hard film of the recording medium from the medium-facing surface of the main magnetic pole layer, and returns to the return-path layer through a soft film of the recording medium. This allows information to be recorded in a region that faces the main magnetic pole layer in the recording medium (see Japanese Unexamined Patent Application Publication No. 2005-122831) (corresponding to US Publication No. 2005/0083608 A1).

In recent years, a so-called shielded pole structure is suggested in which the spacing (gap spacing) between a main magnetic pole layer and a return path layer in a surface that faces a recording medium is narrowed to about 50 nm so that magnetic recording that has little leakage can be realized by controlling divergence of a magnetic field directed to the return path layer from the main magnetic pole layer. In a perpendicular magnetic recording head device that has the shielded pole structure, the dimension (throat height) of the return path layer in a depth direction in addition to the above gap spacing becomes an important parameter for controlling a recording magnetic field. It is thus necessary to set this throat height properly.

However, in the structure described in Japanese Unexamined Patent Application Publication No. 2005-122831, if the throat height is set low, the facing area between a main magnetic pole layer 1 and a return path layer 2 becomes small as shown in FIG. 10A, and consequently a magnetic flux ($\phi x$) leaks easily toward a recording medium M from the main magnetic pole layer 1. For this reason, a magnetic flux returning to the return path layer from the main magnetic pole layer diverges easily, and thus it becomes difficult to sufficiently increase magnetic field gradient (sharpness in the change of magnetic field intensity in a recording region). As a result, excellent recording performance cannot be exhibited. On the other hand, if the throat height is set high, the facing surface between the main magnetic pole layer 1 and the return path layer 2 becomes large as shown in FIG. 10B. Thus, a magnetic flux ($\phi b$) flows easily towards the return path layer from the main magnetic pole layer 1. For this reason, the magnetic field gradient rises, but the magnetic flux ($\phi x$) directed to the recording medium M from the main magnetic pole layer 1 decreases, and thus recording magnetic field intensity may fall. As a result, information recording cannot be performed well.

SUMMARY

The embodiments of the present invention have been made in view of the above points, and it is therefore an object of the present invention to provide a perpendicular magnetic recording head device which can increase magnetic field gradient to exhibit excellent recording performance while maintaining magnetic field intensity capable of performing information recording well.

According to a first aspect of the invention, there is provided a perpendicular magnetic recording head device composed of a main magnetic pole layer and a return path layer which are laminated with a nonmagnetic insulating layer therebetween and having a laminated structure including a proximity region where the main magnetic pole layer and the return path layer are in proximity to each other on a recording medium-facing surface. The return path layer includes a low saturation magnetic flux density layer made of a material that has a relatively low saturation magnetic flux density, at least on the side of the main magnetic pole layer.

According to the above configuration, a magnetic flux is prevented from entering the return path layer directly from the main magnetic pole layer, and divergence of a magnetic flux returning to the return path layer is suppressed by controlling saturation of the high saturation magnetic flux density layer. For this reason, magnetic field gradient can be increased to exhibit excellent recording performance while magnetic field intensity capable of well performed information-recording is maintained.

In the perpendicular magnetic recording head device according to the aspect of the invention, preferably, the return path layer includes a high saturation magnetic flux density layer formed on the low saturation magnetic flux density layer and made of a material that has a relatively high saturation magnetic flux density.

In the perpendicular magnetic recording head device according to the aspect of the invention, preferably, the return path layer further includes a low saturation magnetic flux density layer formed on the high saturation magnetic flux density layer and made of a material that has a relatively low saturation magnetic flux density. According to this configuration, unnecessary concentration of a magnetic flux on the surface of the return path layer that faces the recording medium can be suppressed. As a result, information recording can be performed better.

In the perpendicular magnetic recording head device according to the aspect of the invention, preferably, the return path layer includes a high saturation magnetic flux density layer buried in the low saturation magnetic flux density layer and made of a material that has a relatively high saturation magnetic flux density. According to this configuration, unnecessary concentration of a magnetic flux on the surface of the return path layer that faces the recording medium can be suppressed. As a result, information recording can be performed better.

In the perpendicular magnetic recording head device according to the aspect of the invention, preferably, the spacing between the main magnetic pole layer and the return path layer in the proximity region is about 50 nm, and the thickness of the low saturation magnetic flux density layer on the side of the main magnetic pole layer is about 10 nm to about 100 nm.

According to an embodiment of the invention, in a perpendicular magnetic recording head device composed of a main magnetic pole layer and a return path layer which are laminated with a nonmagnetic insulating layer therebetween and having a laminated structure including a proximity region where the main magnetic pole layer and the return path layer are in proximity to each other on a recording medium-facing surface, the return path layer includes a low saturation magnetic flux density layer made of a material that has a relatively low saturation magnetic flux density, at least on the side of the main magnetic pole layer. Thus, it is possible to provide a perpendicular magnetic recording head device which can increase magnetic field gradient to exhibit excellent recording performance while maintaining magnetic field intensity capable of performing information recording well.

DRAWING

DETAILED DESCRIPTION

Figure 1:
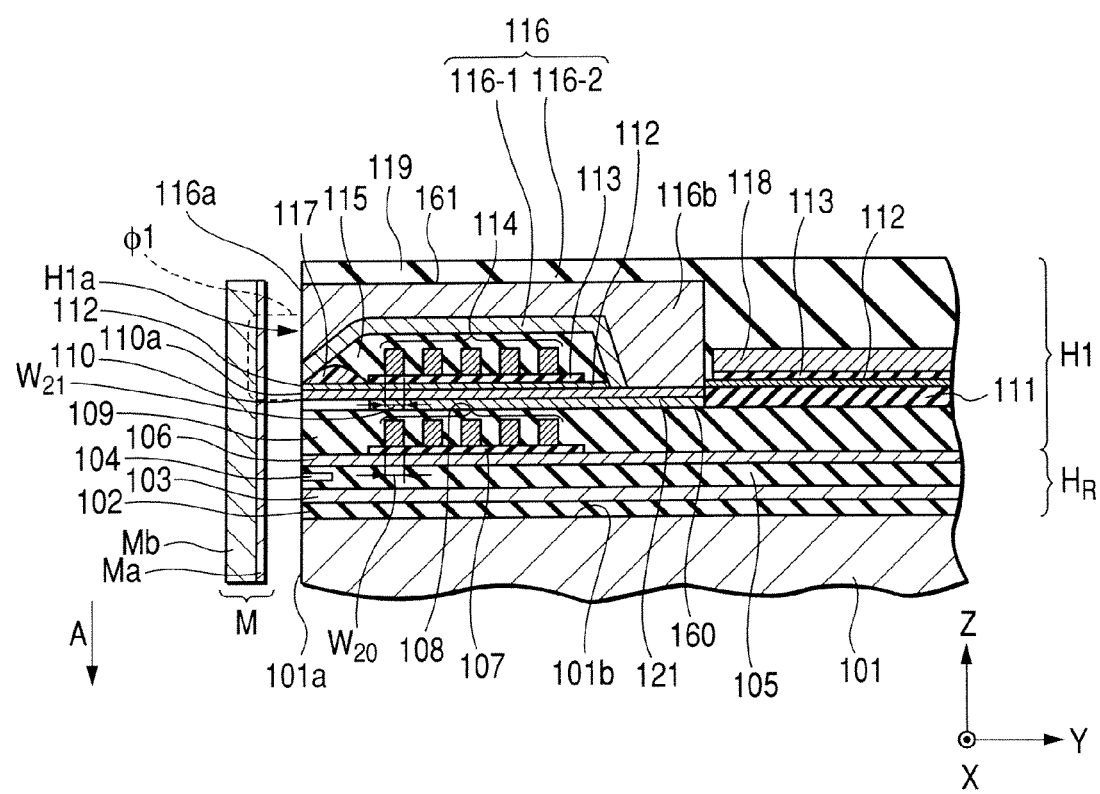
FIG. 1 is a sectional view that shows a perpendicular magnetic recording head device according to an embodiment of the invention.

FIG. 1 is a sectional view that shows a perpendicular magnetic recording head device according to an embodiment of the invention. A perpendicular magnetic recording head H1 shown in FIG. 1 applies a perpendicular magnetic field to a recording medium M to magnetize a hard film Ma of the recording medium M in a perpendicular direction.

The recording medium M has for example a disk-shape. The surface of the recording medium is formed with a hard film Ma that has high residual magnetization, and the inside thereof is formed with a soft film Mb that has high magnetic permeability. The recording medium is rotated about the center of the recording medium M that serves as a rotational axis.

A slider 101 is made of a nonmagnetic material, such as $Al_2O_3$ or TiC, and a facing surface 101a of the slider 101 faces the recording medium M. When the recording medium M rotates, the slider 101 floats from the surface of the recording medium M by airflow over the surface, and the slider 101 slides on the recording medium M. In FIG. 1, the direction of movement of the recording medium M with respect to the slider 101 is an A-direction.

A trailing-side end surface 101b of the slider 101 is a nonmagnetic insulating layer 102 made of a nonmagnetic material, such as $Al_2O_3$ or $SiO_2$. A reading part HR has a lower shielding layer 103, an upper shielding layer 106, and a reading element 104 located within an inorganic insulating layer (gap insulating layer) 105 between the lower shielding layer 103 and the upper shielding layer 106. The reading element 104 is a magneto-resistive effect element, such as an AMR (Anisotropic Magneto-Resistive) element, a GMR (Giant Magneto-Resistive) element, or a TMR (Tunneling Magneto-Resistive) element.

A plurality of first coil layers 108 made of a conductive material are formed on the upper shielding layer 106 with a coil insulating foundation layer 107 therebetween. The first coil layers 108 are made of at least one or two kinds of nonmagnetic metal materials selected from, for example, Au, Ag, Pt, Cu, Cr, Al, Ti, NiP, Mo, Pd, and Rh. The first coil layers 108 may be a laminated structure formed by laminating layers made of those nonmagnetic metal materials.

A coil insulating layer 109 made of an inorganic insulating material, such as $Al_2O_3$, is formed around the first coil layers 108. An upper surface of the coil insulating layer 109 is planarized, and a main magnetic pole layer 110 that has a predetermined length in a height direction from a facing surface H1a, having a track width Wt in a track width direction (X-direction in the figure), and having a predetermined extending length D2 is formed on the upper surface of the coil insulating layer 109. The main magnetic pole layer 110 is made of a ferromagnetic material, and is formed by, for example, plating or the like. As the ferromagnetic material, a material that has a relatively high saturation magnetic flux density, such as Ni—Fe, Co—Fe, or Ni—Fe—Co, can be exemplified.

Moreover, a yoke part 121 which is integral with the main magnetic pole layer 110 from a base end of the main magnetic pole layer 110 and which extends in the height direction (Y-direction in the figure) so as to have a greater width in the track width direction than the track width Wt. The main magnetic pole layer 110 and the yoke part 121 constitute a first magnetic pole section 160. Although the present embodiment has been described about the case where the main magnetic pole layer 110 and the yoke part 121 are formed separately, the main magnetic pole layer 110 and the yoke part 121 may be formed integrally. In the magnetic head H1 shown in FIG. 1, the first magnetic pole section 160 which is constituted with the main magnetic pole layer 110 and the yoke part 121 becomes a magnetic pole section located on the side of the reading part.

In the present embodiment, the track width Wt is, for example, 0.05 μm to 1.0 μm, and the length D1 is, for example, 1.0 μm or less. Further, the yoke part 121 is, for example, about 1 μm to 100 μm in a widest portion of a width n the track width direction (X-direction in the figure), and the length of the yoke part 121 in the height direction is, for example, about 1 μm to 100 μm.

Figure 2:
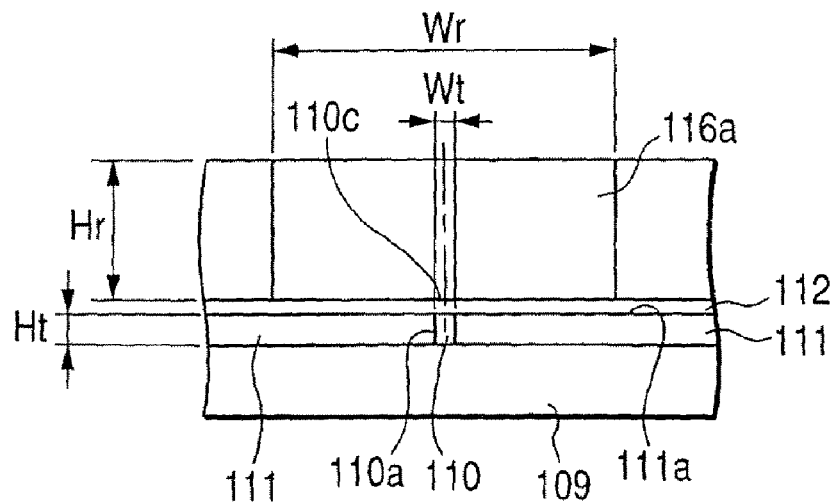
FIG. 2 is a front view that shows a perpendicular magnetic recording head shown in FIG. 1.

FIG. 2 is a front view that shows the perpendicular magnetic recording head H1 shown in FIG. 1. In addition, FIG. 1 is a sectional view as seen from an arrow direction after the perpendicular magnetic recording head is cut by a phantom line shown in FIG. 2.

As shown in FIG. 2, the main magnetic pole layer 110 appearing on the facing surface H1a is formed such that the width of the main magnetic pole layer in the track width direction (X-direction) becomes Wt. In addition, the dimension of the yoke part 121 in the track width direction is made greater than the width Wt of the main magnetic pole layer 110 in the track width direction.

As shown in FIG. 2, an insulating material layer 111 is provided around the main magnetic pole layer 110. Also, an upper surface 110c of the main magnetic pole layer 110 and an upper surface 111a formed around the main magnetic pole layer 110 are almost flush with each other. The insulating material layer 111 is made of at least one or two kinds of materials selected from, for example, $Al_2O_3$, $SiO_2$, Al—Si—O, Ti, W, and Cr. A gap layer 112 made of an inorganic material, such as $Al_2O_3$ or $SiO_2$ is provided on the main magnetic pole layer 110 and the yoke part 121, and on the insulating material layer 111.

As shown in FIG. 1, a second coil layer 114 is formed on the gap layer 112 with a coil insulating foundation layer 113 therebetween. Similarly to the first coil layer 108, a plurality of the second coil layers are formed, and they are made of a conductive material. The second coil layers 114 are made of at least one or two kinds of materials selected from, for example, Au, Ag, Pt, Cu, Cr, Al, Ti, NiP, Mo, Pd, and Rh. The second coil layers 114 may be a laminated structure formed by laminating layers made of those nonmagnetic metal materials.

Each of the first coil layers 108 and each of the second coil layers 114 are electrically connected to each other at their ends in the track width direction (X-direction in the figure), and the first coil layers 108 and the second coil layers 114 constitute a solenoid coil layer wound around the main magnetic pole layer 110 and the yoke part 121.

As shown in FIG. 1, the width $W_{20}$ of the first coil layers 108 in the height direction (Y-direction in the figure) and the width $W_{21}$ of the second coil layers 114 in the height direction (Y-direction in the figure) are almost equal to each other.

A coil insulating layer 115 formed of an organic insulating material, such as resist, is formed around the second coil layers 114, and a return path layer 116 that is a second magnetic pole section 161 made of a ferromagnetic material, such as permalloy, is formed from the coil insulating layer 115 to the gap layer 112 on the second insulating layer and the gap layer. This return path layer 116 includes a low saturation magnetic flux density layer 116-1 made of a material that has a relatively low saturation magnetic flux density, at least on the side of the main magnetic pole layer 110, and a high saturation magnetic flux density layer 116-2 made of a material that has a relatively high saturation magnetic flux density is formed on the low saturation magnetic flux density layer 116-1. In addition, the expression 'at least on the side of the main magnetic pole layer 110' may refer to a region closest to at least the main magnetic pole layer 110 in the return path layer 116, and the low saturation magnetic flux density layer 116-1 desirably exists in this region, according to an exemplary embodiment of the present invention.

As shown in FIG. 2, the thickness Ht of a front end surface 110a of the main magnetic pole layer 110 is smaller than the thickness Hr of a front end surface 116a of the return path layer 116, and the width Wt of the front end surface 110a of the main magnetic pole layer 110 in the track width direction (X-direction in the figure) is sufficiently smaller than the width Wr of the front end surface 116a of the return path layer 116 in the same direction. As a result, on the facing surface H1a, the area of the front end surface 110a of the main magnetic pole layer 110 is sufficiently smaller than the area of the front end surface 116a of the return path layer 116. Therefore, the magnetic flux $\phi_1$ of a leak recording magnetic field is concentrated on the front end surface 110a of the main magnetic pole layer 110, and the hard film Ma of the recording medium M is magnetized in the perpendicular direction by the concentrated magnetic flux $\phi_1$, thereby recording information.

The front end surface 116a of the return path layer 116 is exposed at the facing surface H1a that faces the recording medium M. Moreover, a connecting part 116b of the return path layer 116 and the main magnetic pole layer 110 are connected to each other on the deeper side than the facing surface H1a. This forms a path which passes through the return path layer 116 from the main magnetic pole layer 110.

In addition, a Gd defining layer 117 made of an organic material or an inorganic material is formed an the gap layer 112 in a position a predetermined distance away from the facing surface H1a that faces the recording medium M. The gap depth of the perpendicular magnetic recording head H1 is defined by the distance from the facing surface H1a that faces the recording medium M to a front end edge of the Gd defining layer 117. The gap depth defines the dimension (throat height) of the return path layer in the depth direction.

A lead layer 118 extending from the second coil layers 114 is formed on the side of the connecting part 116b of the return path layer 116 in the height direction (Y-direction) with the coil insulating foundation layer 113 therebetween. Also, the return path layer 116 and the lead layer 118 are covered with a protective layer 119 made of an inorganic magnetic insulating material or the like. In this manner, the perpendicular magnetic recording head H1 is configured, having a laminated structure constituted with the main magnetic pole layer 110 and the return path layer 116 which are laminated with the coil insulating layer 115 that serves as an nonmagnetic insulating layer disposed therebetween, and including a proximity region where the main magnetic pole layer 110 and the return path layer 116 are in proximity to each other an the surface that faces the recording medium M In the perpendicular magnetic recording head H1, when a recording electric current is applied to the first coil layers 108 and the second coil layers 114 via the lead layer 118, a recording magnetic field is induced to the main magnetic pole layer 110 and the return path layer 116 by a current magnetic field of an electric current flowing through the first coil layers 108 and the second coil layers 114. Then, in the facing surface H1a, a magnetic flux $\phi_1$ of the recording magnetic field jumps out of the front end surface 110a of the main magnetic pole layer 110, and the magnetic flux $\phi_1$ of the recording magnetic field passes through the soft film Mb through the hard film Ma of the recording medium M. This allows information to be written in the recording medium M. Thereafter, the magnetic flux φ1 returns to the front end surface 116a of the return path layer 116. In this manner, perpendicular magnetic recording is performed on the recording medium M.

Figure 3:
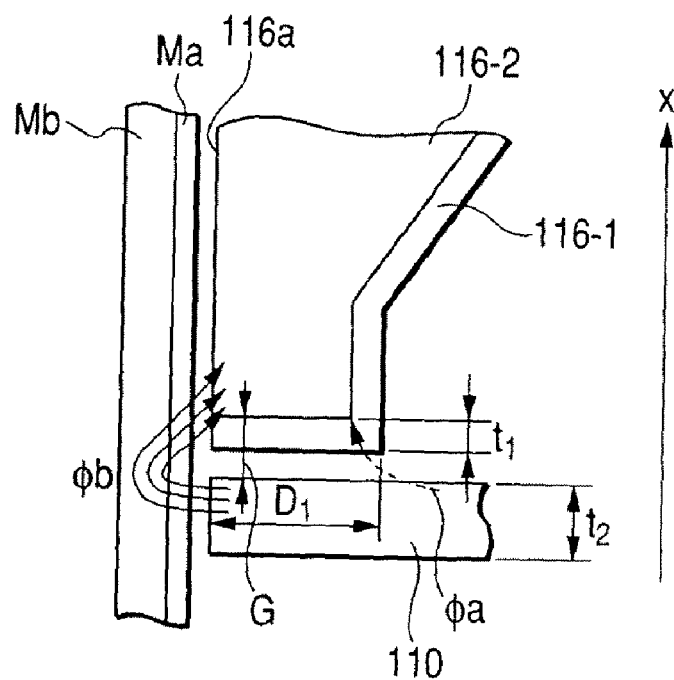
FIG. 3 is an enlarged view that shows the magnetic pole section in the perpendicular magnetic recording head device according to the embodiment of the invention.

Next, the relationship between the main magnetic pole layer and the return path layer in the perpendicular magnetic recording head device of the invention will be described. FIG. 3 is an enlarged view that shows the magnetic pole section in the perpendicular magnetic recording head device according to the embodiment of the invention. In FIG. 3, a proximity region where the main magnetic pole layer 110 and the return path layer 116 are in proximity to each other on the surface that faces the recording medium M is shown, and in order to simplify explanation, only the main magnetic pole layer 110, the return path layer 116, and the recording medium M are shown, and the gap layer 112 is omitted.

As can be seen from FIG. 3, the return path layer 116 includes the low saturation magnetic flux density (lower Bs layer) 116-1 made of a material that has a relatively low saturation magnetic flux density, at least on the side of the main magnetic pole layer 110. In the configuration shown in FIG. 3, the return path layer has a two-layer structure composed of the low Bs layer 116-1, and the high saturation magnetic flux density (high Bs layer) 116-2 which is formed on the low Bs layer 116-1 and is made of a material that has a relatively high saturation magnetic flux density. Moreover, the low Bs layer 116-1 is formed along the coil insulating layer 115. Furthermore, in the front end surface 116a of the return path layer 116, the low Bs layer 116-1 and the high Bs layer 116-2 are exposed.

As the material for forming the low Bs layer 116-1, a material that has a saturation magnetic flux density of about 0.1 T (Tesla) is preferable. As such a material, for example, a permalloy of Ni:Fe=80:20 can be exemplified. Moreover, as the material for forming the high Bs layer 116-2, a material that has a saturation magnetic flux density of about 1.5 T or more is preferable. As such a material, for example, Co—Fe, Co—Fe—Ni, Fe—Ni, etc. can be exemplified.

Figure 4:
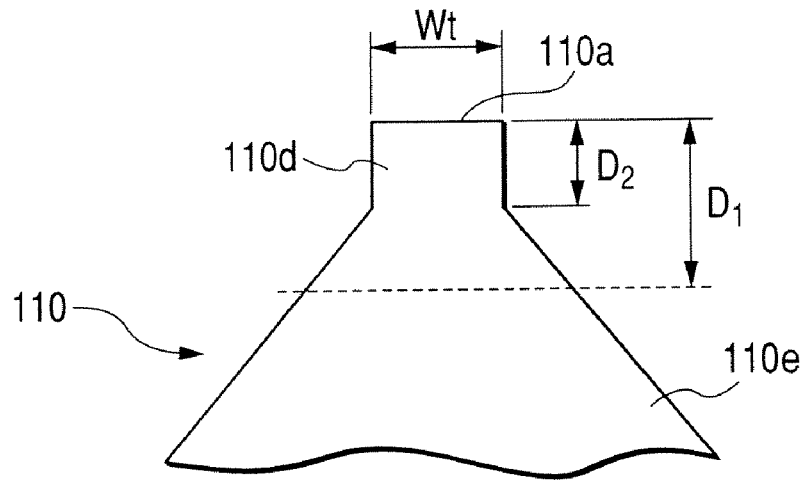
FIG. 4 is a plan view that shows a main magnetic pole layer in the perpendicular magnetic recording head device according to the embodiment of the invention.

In the present embodiment, the magnetic pole section has a shape shown in FIGS. 3 and 4. Specifically, the thickness G of the gap layer 112 is set to about 50 nm, the thickness (throat height) t1 of the low Bs layer 116-1 is set to about 50 nm, the depth D1 of the proximity region of the return path layer 116 in the height direction is set to about 200 nm, the depth D2 of an extending portion 110d of the main magnetic pole layer 110 in the height direction is set to about 100 nm, and the thickness t2 of the main magnetic pole layer 110 is set to about 300 nm. Moreover, the main magnetic pole layer 110 has a wide portion 110e joined to the extending portion 110d, and the wide portion 110e has such a shape that the width thereof increases in the height direction from the surface 110a that faces the recording medium M in plan view.

The low Bs layer 116-1 serves to prevent a magnetic flux φa (leakage flux) from entering the return path layer 116 directly from the main magnetic pole layer 110. This makes it possible to reduce the loss of a recording magnetic field to obtain magnetic field intensity enough to record information. Moreover, the low Bs layer 116-1 can control saturation of the high Bs layer 116-2 to suppress divergence of a magnetic flux φb returning to the return path layer 116, thereby improving magnetic field gradient. For this reason, the thickness H1 of the low Bs layer 116-1 is required to be a thickness enough to prevent a magnetic flux from entering the return path layer 116 directly from the main magnetic pole layer 110 and to control saturation of the high Bs layer 116-2 to suppress divergence of the returning magnetic flux φb to the return path layer 116. It is preferable that the thickness t1 of the low Bs layer 116-1 be, for example, about 10 nm to about 100 nm. In addition, since the thickness t1 of the low Bs layer 116-1 varies in its preferable range depending on the thickness G of the gap layer 112, the distance from the return path layer 116 to the soft film Mb of the recording medium M, the throat height D1, etc, it can be appropriately determined in consideration of these conditions.

It is preferable that the thickness of the high Bs layer 116-2 be about 100 nm or more when suppression of generation of an improper (recording) magnetic field caused by edges of a return path layer is taken into consideration. It is preferable that the depth D1 in the height direction in the proximity region of the return path layer 116 be about 200 nm (about 100 nm to 300 nm) when an improvement in electric field intensity, or the like is taken into consideration. It is preferable that the depth D2 of the extending portion 110d of the main magnetic pole layer 110 be about 100 nm or more when generation of a sufficient magnetic field intensity, or the like is taken into consideration.

Figure 5:
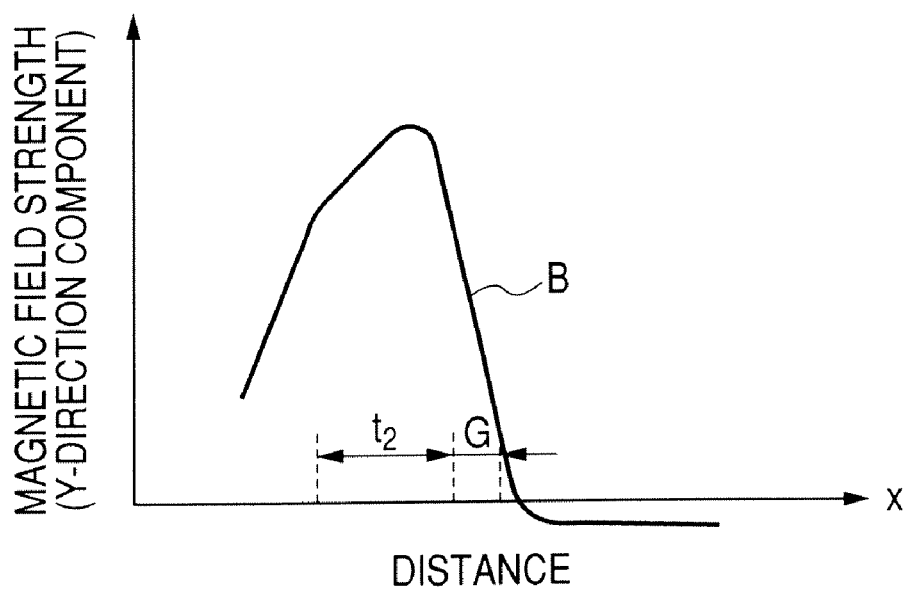
FIG. 5 is a characteristics view that shows the relationship between the distance and magnetic field intensity of the magnetic pole section.

As such, since the perpendicular magnetic recording head device according to the present embodiment is configured such that a return path layer includes the low Bs layer 116-1 at least on the side of the main magnetic pole layer 110, a magnetic flux is prevented from entering the return path layer 116 directly from the main magnetic pole layer 110, and divergence of the magnetic flux φb returning to the return path layer 116 is suppressed by controlling saturation of the high Bs layer 116-2. For this reason, magnetic field gradient can be increased to exhibit excellent recording performance while magnetic field intensity capable of performing information recording well is maintained. Specifically, when the perpendicular magnetic recording head device according to the present embodiment performs information recording, a recording magnetic field to be applied to the hard film Ma of the recording medium M shows a characteristic curve B as shown in FIG. 5. As can be seen from FIG. 5, this information recording shows excellent magnetic field gradient (sharpness in the change of magnetic field intensity in a recording region) while maintaining sufficient magnetic field intensity. As a result, in the perpendicular magnetic recording head device according to the present embodiment, generation of noises in a magnetization reversal region of a recording medium can be suppressed, thereby performing good information recording.

The return path layer 116 is provided by forming the gap layer 112 on the main magnetic pole layer 110 whose surface has been polished, forming the second coil layers 114 on the gap layer 112, and forming the coil insulating layer 115 on the second coil layers 114, and thereafter by applying (for example, sputtering) a material constituting the low Bs layer 116-1 to form the low Bs layer 116-1, applying (for example, plating) a material constituting the high Bs layer 116-2 to form the high Bs layer 116-2, and polishing the front end surface 116a.

Figure 6:
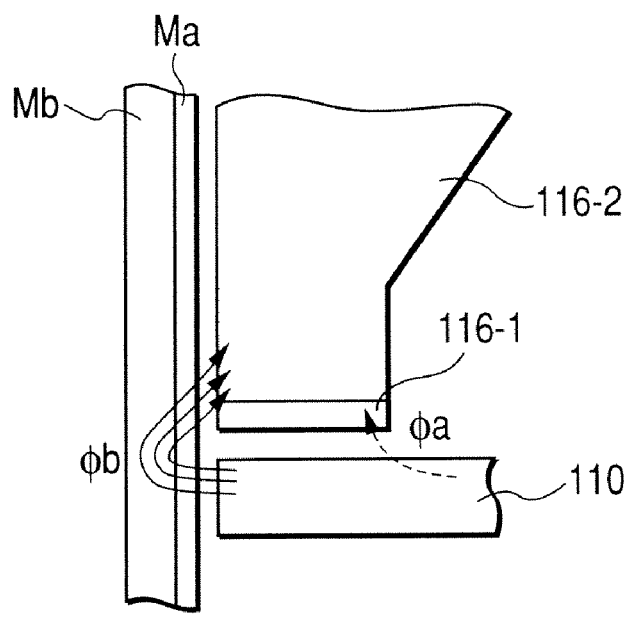
FIG. 6 is an enlarged view that shows another example of the magnetic pole section in the perpendicular magnetic recording head device according to the embodiment of the invention.

FIG. 6 is an enlarged view that shows another example of the magnetic pole section in the perpendicular magnetic recording head device according to the embodiment of the invention. As can be seen from FIG. 6, the return path layer 116 includes the low Bs layer 116-1 made of a material that has a relatively low saturation magnetic flux density, at least on the side of the main magnetic pole layer 110. Even in the configuration shown in FIG. 6, the return path layer 116 has a two-layer structure composed of the low Bs layer 116-1, and the high Bs layer 116-2 formed on the low Bs layer 116-1. In this configuration, the low Bs layer 116-1 is provided only in a region that faces the main magnetic pole layer 110, and is not formed along the coil insulating layer 115. Moreover, in the front end surface 116a of the return path layer 116, the low Bs layer 116-1 and the high Bs layer 116-2 are exposed.

Since the return path layer 116 includes the low Bs layer 116-1 at least on the side of the main magnetic pole layer 110 even in the perpendicular magnetic recording head device that has the magnetic pole section shown in FIG. 6, a magnetic flux is prevented from entering the return path layer 116 directly from the main magnetic pole layer 110, and divergence of the magnetic flux φb returning to the return path layer 116 is suppressed by controlling saturation of the high Bs layer 116-2. For this reason, magnetic field gradient can be increased to exhibit excellent recording performance while magnetic field intensity capable of performing information recording well is maintained.

The return path layer 116 is provided by forming the gap layer 112 on the main magnetic pole layer 110 whose surface has been polished, applying (far example, sputtering) a material constituting the low Bs layer 116-1 to form the low Bs layer 116-1, and thereafter by applying (for example, plating) a material constituting the high Bs layer 116-2 to form the high Bs layer 116-2, then removing the low Bs layer 116-1 excluding a region that faces the main magnetic pole layer 110 by, for example, milling, then forming a coil layer and a coil insulating layer, then forming an additional portion for connecting with the connecting part 116b, and finally polishing the front end surface 116a.

Figure 7:
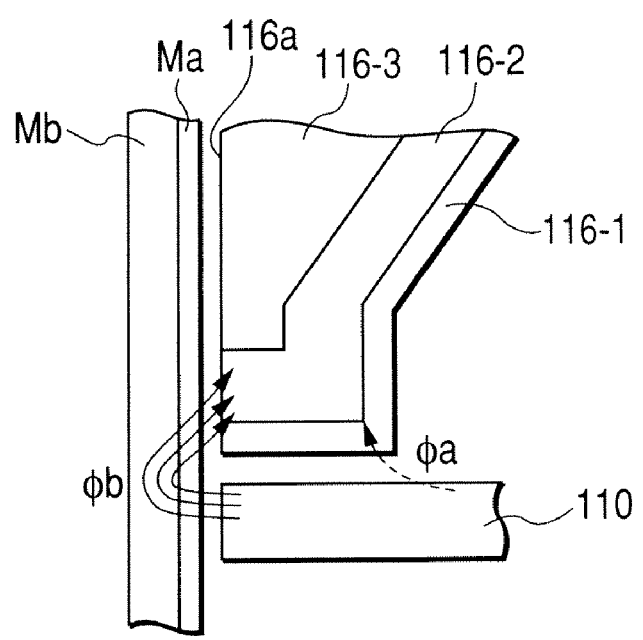
FIG. 7 is an enlarged view that shows still another example of the magnetic pole section in the perpendicular magnetic recording head device according to the embodiment of the invention.

FIG. 7 is an enlarged view that shows still another example of the magnetic pole section in the perpendicular magnetic recording head device according to the embodiment of the invention. As can be seen from FIG. 7, the return path layer 116 includes the low Bs layer 116-1 made of a material that has a relatively low saturation magnetic flux density, at least an the side of the main magnetic pole layer 110. Further, the high Bs layer 116-2 is formed on the low Bs layer 116-1, and a low Bs layer 116-3 is formed on the high Bs layer 116-2. That is, the return path layer 116 shown in FIG. 7 has a three-layer structure composed of the low Bs layer 116-1, the high Bs layer 116-2 formed on the low Bs layer 116-1, and the low Bs layer 116-3 formed on the high Bs layer 116-2. In this configuration, the low Bs layer 116-1 is formed along the coil insulating layer 115. Moreover, in the front end surface 116a of the return path layer 116, the low Bs layer 116-1, the high Bs layer 116-2, and the low Bs layer 116-3 are exposed.

Since the return path layer 116 includes the low Bs layer 116-1 at least on the side of the main magnetic pole layer 110 even in the perpendicular magnetic recording head device that has the magnetic pole section shown in FIG. 7, a magnetic flux is prevented from entering the return path layer 116 directly from the main magnetic pole layer 110, and divergence of the magnetic flux φb returning to the return path layer 116 is suppressed by controlling saturation of the high Bs layer 116-2. For this reason, magnetic field gradient can be increased to exhibit excellent recording performance while magnetic field intensity capable of performing information recording well is maintained. By adopting such a structure, unnecessary concentration of a magnetic flux on the surface 116a of the return path layer 116 that faces the recording medium M can be suppressed. As a result, information recording can be performed better.

The return path layer 116 as shown in FIG. 7 is provided by forming the gap layer 112 on the main magnetic pole layer 110 whose surface has been polished, forming the second coil layers 114 on the gap layer 112, and forming the coil insulating layer 115 on the second coil layers 114, and thereafter by applying (for example, sputtering) a material constituting the low Bs layer 116-1 to form the low Bs layer 116-1, applying (for example, plating) a material constituting the high Bs layer 116-2 to form the high Bs layer 116-2, applying (for example, plating) a material constituting the low Bs layer 116-2 to form the low Bs layer 116-2, and polishing the front end surface 116a.

Figure 8:
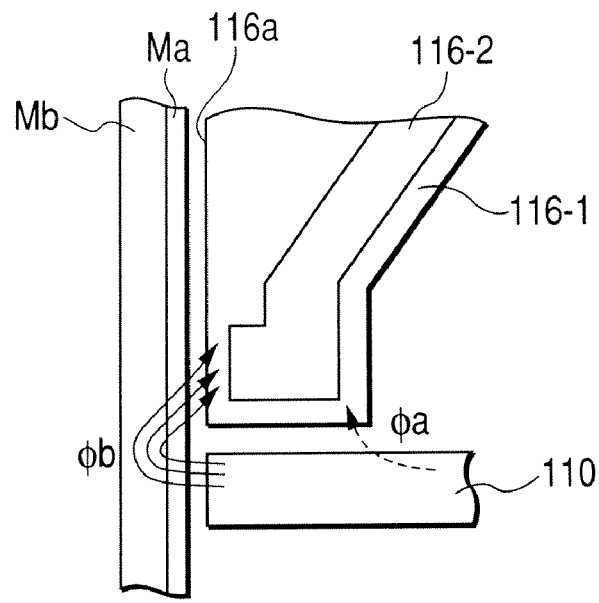
FIG. 8 is an enlarged view that shows still a still further example of the magnetic pole section in the perpendicular magnetic recording head device according to the embodiment of the invention.

FIG. 8 is an enlarged view that shows still another example of the magnetic pole section in the perpendicular magnetic recording head device according to the embodiment of the invention. As can be seen from FIG. 7, the return path layer 116 includes the low Bs layer 116-1 made of a material that has a relatively low saturation magnetic flux density, at least on the side of the main magnetic pole layer 110. Further, the high Bs layer 116-2 is buried in the low Bs layer 116-1. Since the return path layer includes the low Bs layer 116-1 at least on the side of the main magnetic pole layer 110 even in the perpendicular magnetic recording head device that has the magnetic pole section shown in FIG. 8, a magnetic flux is prevented from entering the return path layer 116 directly from the main magnetic pole layer 110, and divergence of the magnetic flux φb returning to the return path layer 116 is suppressed by controlling saturation of the high Bs layer 116-2. For this reason, magnetic field gradient can be increased to exhibit excellent recording performance while magnetic field intensity capable of performing information recording well is maintained. By adopting such a structure, similarly to the structure of FIG. 7, unnecessary concentration of a magnetic flux on the surface 116a of the return path layer 116 that faces the recording medium M can be suppressed. As a result, information recording can be performed better.

The return path layer 116 as shown in FIG. 8 is provided by forming the gap layer 112 on the main magnetic pole layer 110 whose surface has been polished, forming the second coil layers 114 an the gap layer 112, and forming the coil insulating layer 115 on the second coil layers 114, and thereafter by applying (for example, sputtering) a material constituting the low Bs layer 116-1 to form the low Bs layer 116-1, applying (for example, plating) a material constituting the high Bs layer 116-2 to form the high Bs layer 116-2, then removing the high Bs layer 116-2 on the side of the front end surfaces 116a by, for example, milling, then applying (for example, plating) a material constituting the low Bs layer 116-3 to form the low Bs layer 116-3, and finally polishing the front end surface 116a.

Figure 9:
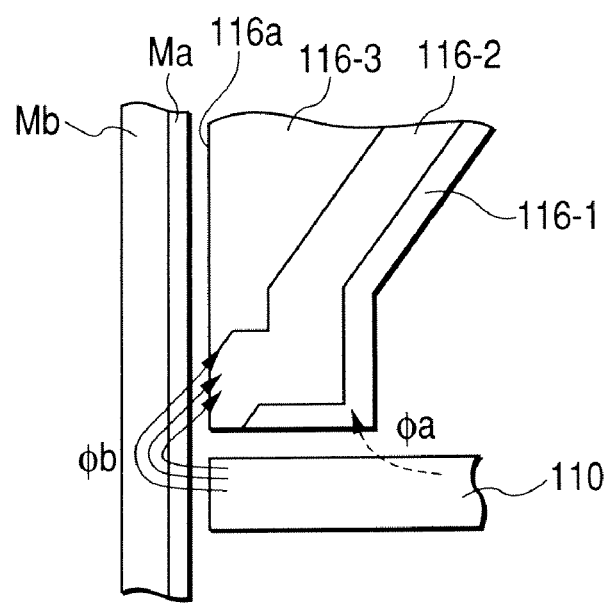
FIG. 9 is an enlarged view that shows a still further example of the magnetic pole section in the perpendicular magnetic recording head device according to the embodiment of the invention.
Figure 10A:
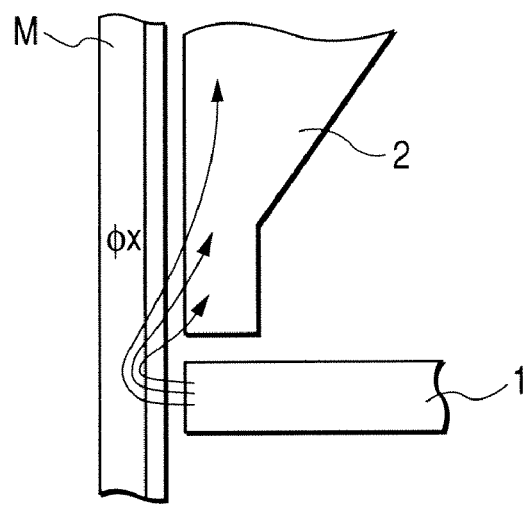
FIGS. 10A and 10B are enlarged views that shows a magnetic pole section in a conventional perpendicular magnetic recording head device.
Figure 10B:
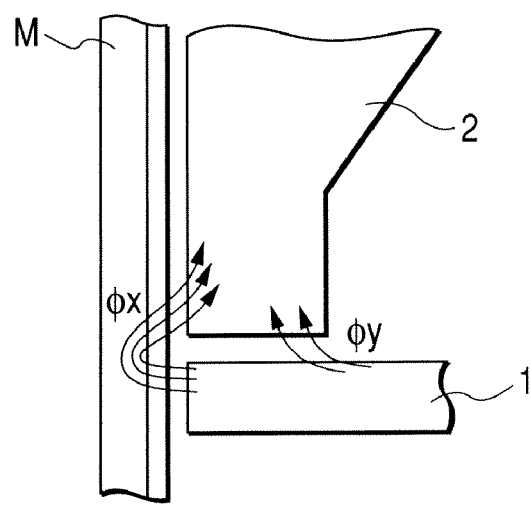

FIG. 9 is an enlarged view that shows still another example of the magnetic pole section in the perpendicular magnetic recording head device according to the embodiment of the invention. As can be seen from FIG. 7, the return path layer 116 includes the low Bs layer 116-1 made of a material that has a relatively low saturation magnetic flux density, at least on the side of the main magnetic pole layer 110. Further, similarly to the structure of FIG. 7, the high Bs layer 116-2 is formed on the low Bs layer 116-1, and the low Bs layer 116-3 is formed on the high Bs layer 116-2. That is, the return path layer 116 shown in FIG. 8 has a three-layer structure composed of the low Bs layer 116-1, the high Bs layer 116-2 formed on the low Bs layer 116-1, and the low Bs layer 116-3 formed on the high Bs layer 116-2. In this configuration, the low Bs layer 116-1 is formed along the coil insulating layer 115. Moreover, in the front end surface 116a of the return path layer 116, the low Bs layer 116-1, the high Bs layer 116-2, and the low Bs layer 116-3 are exposed. Since the return path layer 116 includes the low Bs layer 116-1 at least on the side of the main magnetic pole layer 110 even in the perpendicular magnetic recording head device that has the magnetic pole section shown in FIG. 9, a magnetic flux is prevented from entering the return path layer 116 directly from the main magnetic pole layer 110, and divergence of the magnetic flux φb returning to the return path layer 116 is suppressed by controlling saturation of the high Bs layer 116-2. For this reason, magnetic field gradient can be increased to exhibit excellent recording performance while magnetic field intensity capable of well performed information recording is maintained. Moreover, by adopting such a structure, unnecessary concentration of a magnetic flux on the surface 116*a* of the return path layer 116 that faces the recording medium M can be suppressed. As a result, information recording can be performed better. The structure shown in FIG. 9 can be manufactured similarly to the structure shown in FIG. 7.

The invention is not limited to the above embodiment, but can be changed in various ways. For example, as for other configurations than the relationship between the main magnetic pole layer and the return path layer in the perpendicular magnetic recording head device, various configurations can be adopted without departing from the scope of the invention. The materials and dimensions of the individual layers in the present embodiment are just illustrative, and are not limited thereto. That is, the materials and dimensions of the layers can be changed appropriately without departing from the scope of the invention.

The invention claimed is:

1. A perpendicular magnetic recording head device composed of a main magnetic pole layer and a return path layer which are laminated with a nonmagnetic insulating layer therebetween and having a laminated structure including a proximity region where the main magnetic pole layer and the return path layer are in proximity to each other on a recording medium-facing surface, wherein the return path layer includes a low saturation magnetic flux density layer made of a material that has a relatively low saturation magnetic flux density to prevent a magnetic flux from intruding into the return path layer from the main magnetic pole layer, at least on the side of the main magnetic pole layer, and wherein the spacing between the main magnetic pole layer and the return path layer in the proximity region is about 50 nm, and the thickness of the low saturation magnetic flux density layer on the side of the main magnetic pole layer is about 10 nm to about 100 nm.

2. The perpendicular magnetic recording head device according to claim 1, wherein the return path layer includes a high saturation magnetic flux density layer formed on the low saturation magnetic flux density layer and made of a material that has a relatively high saturation magnetic flux density.

3. The perpendicular magnetic recording head device according to claim 2, wherein the return path layer further includes a low saturation magnetic flux density layer formed on the high saturation magnetic flux density layer and made of a material that has a relatively low saturation magnetic flux density.

4. The perpendicular magnetic recording head device according to claim 1, wherein the return path layer includes a high saturation magnetic flux density layer buried in the low saturation magnetic flux density layer and made of a material that has a relatively high saturation magnetic flux density.

* * * * *